US010072751B2

(12) United States Patent
Abu-Soud et al.

(10) Patent No.: US 10,072,751 B2
(45) Date of Patent: Sep. 11, 2018

(54) VEHICLE SHIFTER WITH OFFSET CABLE ACTUATOR

(71) Applicant: Dura Operating, LLC, Auburn Hills, MI (US)

(72) Inventors: Sami H. Abu-Soud, Royal Oak, MI (US); Dale A. Beattie, Norton Shores, MI (US); Alberto Polonio Morales, West Bloomfield, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 15/156,840

(22) Filed: May 17, 2016

(65) Prior Publication Data

US 2017/0335950 A1   Nov. 23, 2017

(51) Int. Cl.
  *F16H 59/10*  (2006.01)
  *B60K 20/06*  (2006.01)
  *F16H 61/36*  (2006.01)
  *F16H 59/08*  (2006.01)
  *F16H 59/02*  (2006.01)

(52) U.S. Cl.
  CPC ............ *F16H 59/10* (2013.01); *B60K 20/06* (2013.01); *F16H 59/08* (2013.01); *F16H 61/36* (2013.01); *F16H 2059/0247* (2013.01); *F16H 2059/0265* (2013.01)

(58) Field of Classification Search
  CPC ...... F16H 59/00; F16H 59/02; F16H 59/0204; F16H 2059/0226; F16H 2059/0265; F16H 2059/0247; F16H 59/10; F16H 61/36; B60W 30/19; G05G 2009/04707

USPC ........ 74/473.15, 473.3, 473.31, 473.32, 524, 74/473.1; 403/103, 115, 131
  See application file for complete search history.

(56) References Cited

U.S. PATENT DOCUMENTS

| 4,524,635 A | 6/1985 | Hulin et al. |
| 4,733,573 A * | 3/1988 | Kramer ................. B60K 20/06 74/107 |
| 4,934,208 A | 6/1990 | Carlstrom |

(Continued)

FOREIGN PATENT DOCUMENTS

| CN | 2635429 | 8/2004 |
| CN | 204567299 | 8/2015 |

(Continued)

OTHER PUBLICATIONS

EP Extended Search Report for EP Application No. 17166932.8 dated Sep. 18, 2017, 9 pages.

*Primary Examiner* — William Kelleher
*Assistant Examiner* — Bobby Rushing, Jr.
(74) *Attorney, Agent, or Firm* — Reising Ethington P.C.; Matthew J. Schmidt; Robert E. Ford

(57) ABSTRACT

In at least some implementations, a shifter for a vehicle transmission includes a shift member and a cable actuator. The shift member is pivoted at a first pivot for movement between multiple positions corresponding to multiple transmission gears. The cable actuator pivoted at a second pivot, driven for movement about the second pivot by movement of the shift member about the first pivot and has a cable connector adapted to be connected to a shift cable that is associated with the vehicle transmission, wherein the first pivot is arranged about a first axis and the second pivot is arranged about a second axis that is not parallel to the first axis.

19 Claims, 6 Drawing Sheets

(56) References Cited

U.S. PATENT DOCUMENTS

| | | | | |
|---|---|---|---|---|
| 6,155,130 | A * | 12/2000 | Oda | F16H 59/10 74/473.3 |
| 6,327,928 | B1 * | 12/2001 | Bowerman | B60K 20/06 74/473.15 |
| 6,945,132 | B2 * | 9/2005 | Kim | F16H 59/0204 74/335 |
| 7,909,731 | B2 | 3/2011 | Avers et al. | |
| 2005/0066760 | A1 * | 3/2005 | Takikawa | B60K 20/08 74/473.31 |
| 2009/0211388 | A1 * | 8/2009 | Meysenburg | F16H 59/10 74/473.15 |
| 2010/0275715 | A1 * | 11/2010 | Ruhlander | F16C 1/14 74/473.15 |
| 2012/0067154 | A1 * | 3/2012 | Rouleau | F16H 61/0213 74/473.15 |
| 2014/0157932 | A1 * | 6/2014 | Jeong | F16H 59/04 74/473.15 |
| 2015/0090061 | A1 * | 4/2015 | Skogward | F16H 59/04 74/473.15 |

FOREIGN PATENT DOCUMENTS

| | | |
|---|---|---|
| EP | 0084751 A1 | 8/1983 |
| FR | 2856961 A1 | 1/2005 |
| JP | 2008037297 | 2/2008 |
| KR | 20030015035 | 2/2003 |
| KR | 100505720 B1 | 8/2005 |
| KR | 20120022441 | 3/2012 |
| WO | WO2006097648 A1 | 9/2006 |

\* cited by examiner

VEHICLE SHIFTER WITH OFFSET CABLE ACTUATOR

TECHNICAL FIELD

The present disclosure relates to a vehicle transmission shifter with a cable actuator offset relative to an axis of the shifter.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift lever movement to a transmission shift mechanism.

SUMMARY

In at least some implementations, a shifter for a vehicle transmission includes a shift member and a cable actuator. The shift member is pivoted at a first pivot for movement between multiple positions corresponding to multiple transmission gears. The cable actuator pivoted at a second pivot, driven for movement about the second pivot by movement of the shift member about the first pivot and has a cable connector adapted to be connected to a shift cable that is associated with the vehicle transmission, wherein the first pivot is arranged about a first axis and the second pivot is arranged about a second axis that is not parallel to the first axis.

This disclosure also relates to a shifter for a vehicle transmission that may include a shift member, a cable actuator and a shift cable. The shift member is pivoted at a first pivot for movement between multiple positions corresponding to multiple transmission gears. The cable actuator is pivoted at a second pivot, driven for movement about the second pivot by movement of the shift member about the first pivot and has a cable connector. The first pivot is arranged about a first axis and the second pivot is arranged about a second axis that is not parallel to the first axis. The shift cable has a core received within a conduit and movable relative to the conduit. The core is connected to the cable connector and movement of the cable actuator about the second pivot moves the core relative to the conduit. The shift cable is adapted to be connected to a transmission shift mechanism so that movement of the core causes a transmission shift when the shifter is installed on the vehicle.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which.

DETAILED DESCRIPTION

Figure 1:
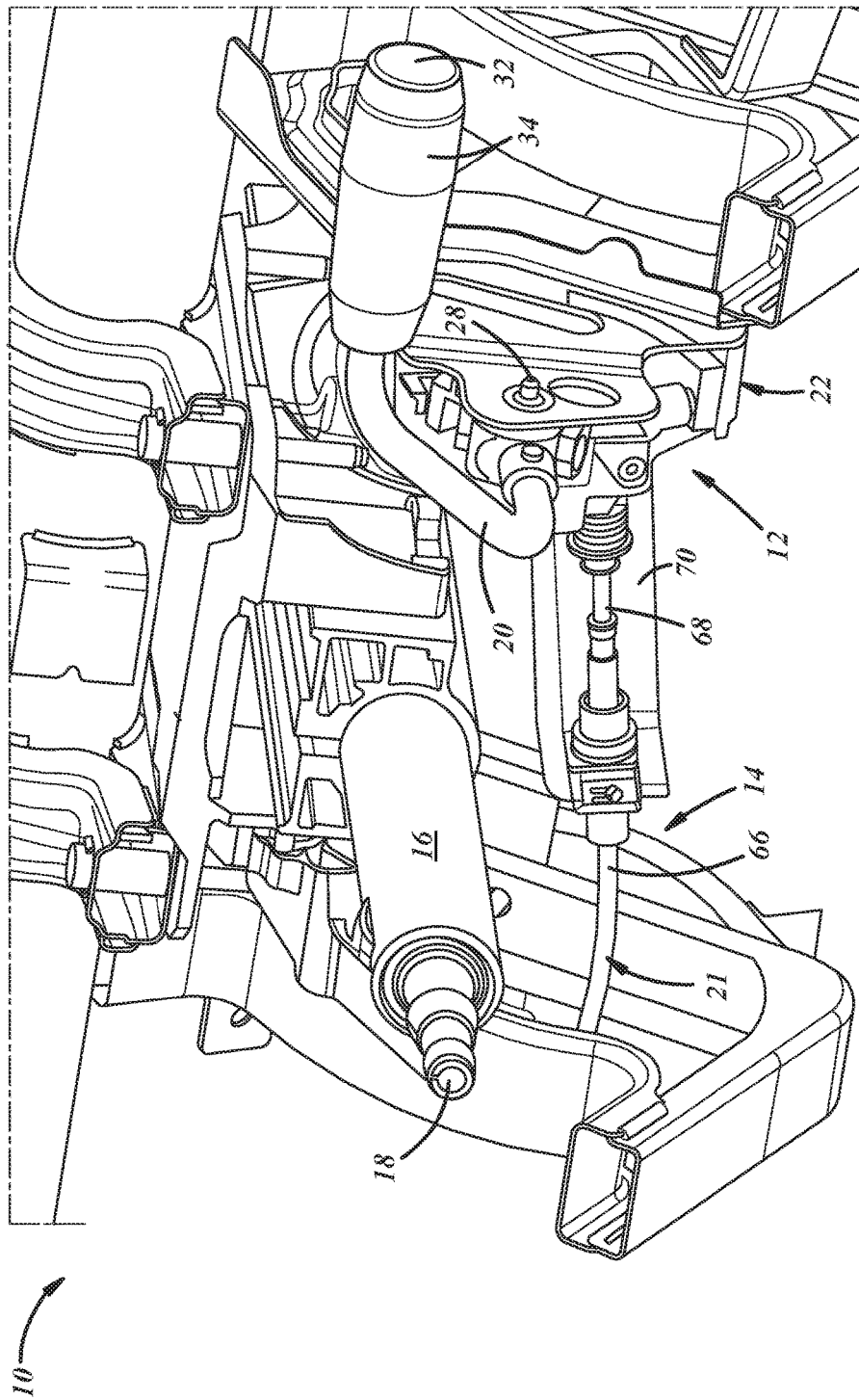
FIG. 1 is a fragmentary perspective view of a portion of a vehicle illustrating a steering assembly and a dashboard mounted transmission shifter.

Referring in more detail to the drawings, FIG. 1 illustrates a portion of a vehicle dashboard or instrument panel 10 with the interior trim removed to show components mounted behind the trim. In the implementations shown, a vehicle transmission shifter assembly 12 is mounted to the instrument panel 10 adjacent to a steering assembly 14 including a main shaft 16 an end 18 of which would receive a steering wheel when the vehicle is assembled. The shifter assembly 12 could also be mounted to the steering assembly 14 (e.g. column mounted) or at a location spaced from the instrument panel or dashboard (e.g. in a center console between two vehicle seats). The shifter assembly 12 includes a shift member or lever 20 that may be moved by a driver to, through a cable 21 associated with the transmission, cause a vehicle transmission to shift among various gears, often including park, neutral, reverse and one or more forward or drive gears.

In more detail, as shown in FIGS. 2-5, the shifter assembly 12 includes a housing 22 or mounting bracket with a base 24 adapted to be fixed to the vehicle such as by suitable fasteners, and one or more wall or supports 26 extending outwardly from the base. The shift member 20 is coupled to one or more supports 26 at a first pivot 28 so that the shift member may rotate or pivot about a first axis 30 relative to the housing 22 between multiple positions that correspond to the various transmission gears or positions. The pivot 28 may include or be defined by a pin or shaft coupled to a support 26. The shift member 20 may have a first end 32 spaced from the housing 22 and adapted to receive or carry a handle 34 that, in use, is manually gripped to facilitate pivoting changing the position of the shift member. And the shift member 20 may have a second end 36 (FIG. 3), where the second end is on the opposite side of the pivot 28 from the first end 32. That is, the shift member 20 is pivoted between its ends 32, 36. In at least some implementations, the first end is outside of and not received within the housing and the second end 36 is received within the housing 22 and, in assembly of the vehicle, is hidden behind an interior trim piece, such as a dashboard or instrument panel covering.

The shift member 20 may be formed in one piece, or multiple pieces, as desired. In the implementation shown, the shift member 20 includes an elongated rod 38 coupled to a base 40, where the base is coupled to the pivot 28 and extends beyond the pivot to define the second end 36 of the shift member.

Figure 3:
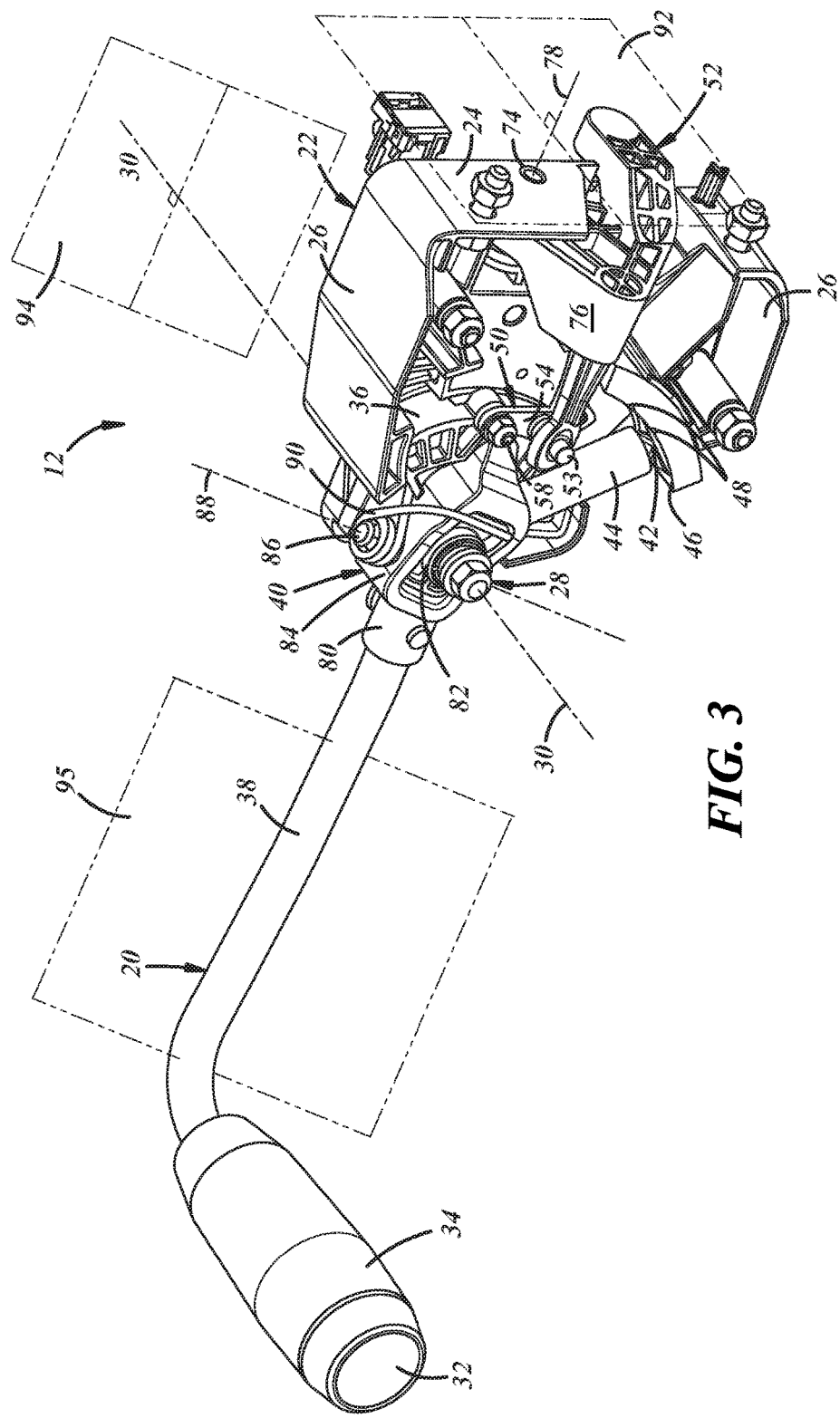
FIG. 3 is a perspective view of an opposite side of the shifter with the shifter shown in a first position.
Figure 4:
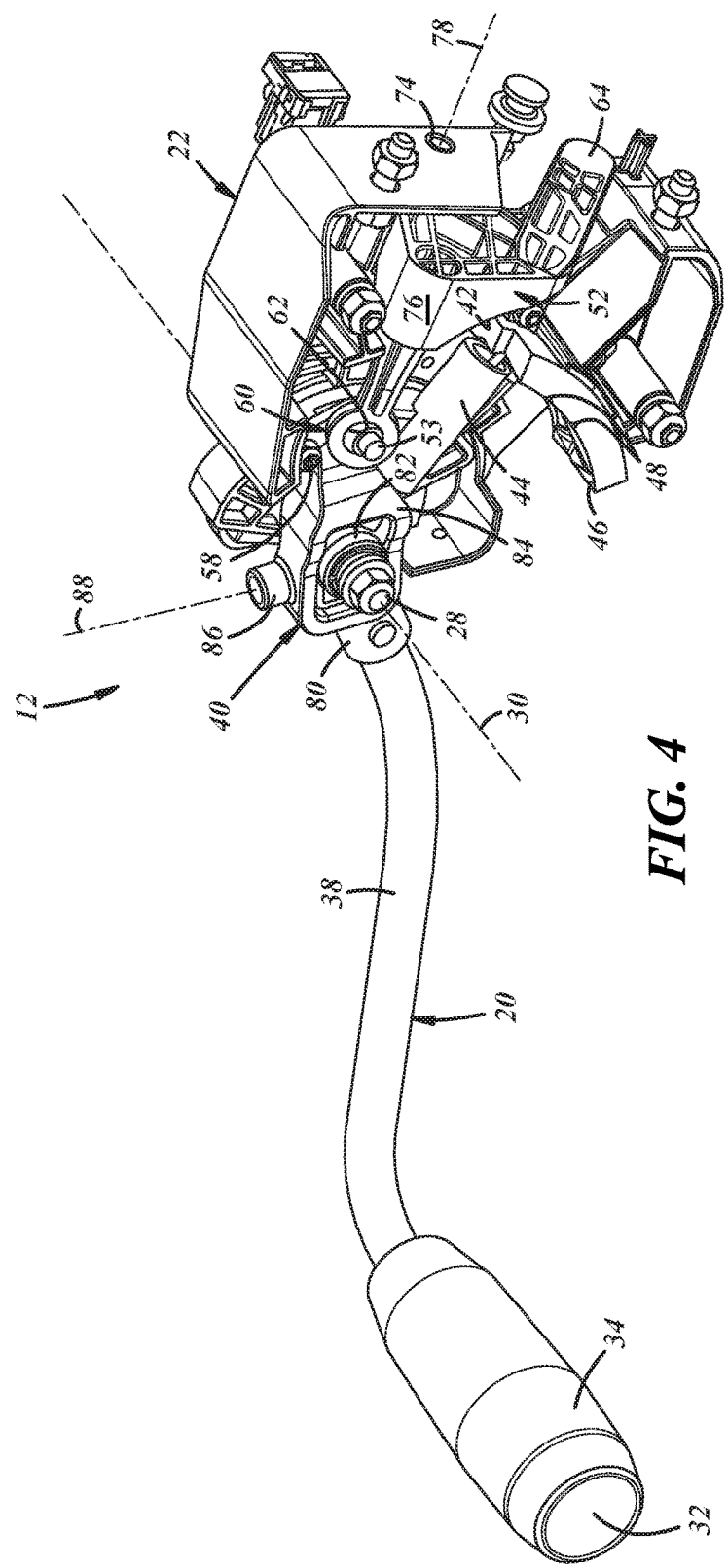
FIG. 4 is a view similar to FIG. 3 with the shifter shown in a second position.
Figure 5:
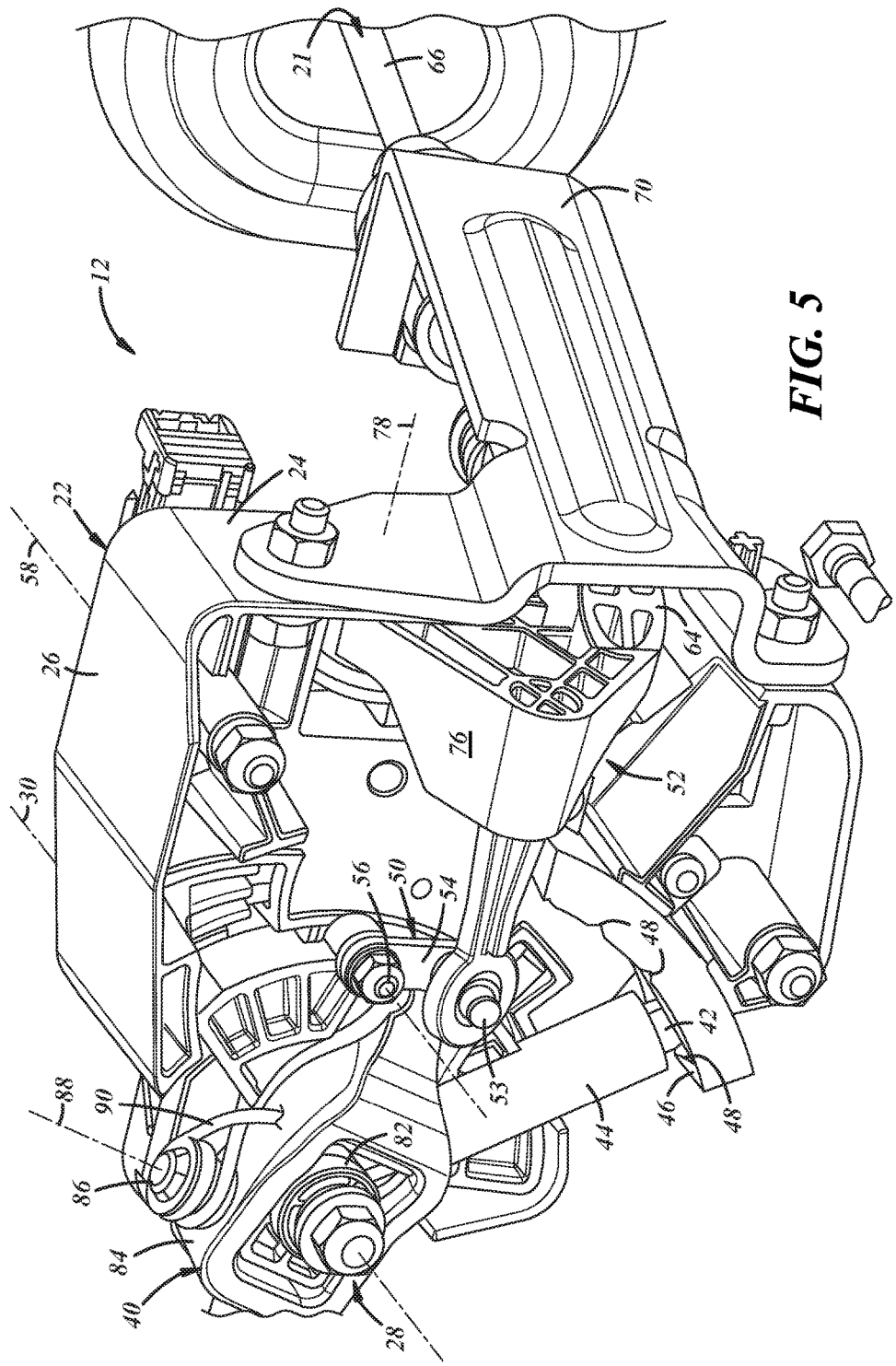
FIG. 5 is an enlarged, fragmentary, perspective view of the shifter.

As best shown in FIGS. 3-5, the base 40 may include or be coupled to other features of the shifter assembly 12. For example, the base 40 may include or carry a follower 42 on an opposite side of the pivot axis 30 from the handle. The follower 42 is shown at an end of a projection 44 extending away from the pivot 28 so that the follower is moved along an arc as the shift member 20 is pivoted. The follower 42 moves along a surface 46 that includes one or more detents 48. Movement of the shift member 20 relative to the housing 22 moves the follower 42 among the detents 48, and when the follower is in a detent, the transmission is in a corresponding one of its gears. Hence, moving the shift member 20 to move the follower 42 from one detent 48 to the next detent causes the transmission to shift from one gear to the next. The interaction of the follower 42 with the detents 48 provides tactile feedback to a driver indicating when a vehicle transmission shift is complete, for example, so that the driver does not stop moving the shift member 20 midway between two positions which might not cause the desired transmission shift. The follower 42, when received in a detent 48, may also help hold or retain the position of the shift member 20 until the shift member is acted upon by someone intended to cause a transmission shift.

In addition to the follower 42, the shift member base 40 may include a coupler 50 that, in assembly, is connected to a cable actuator 52. The coupler 50 is located at or adjacent to the second end 36 of the base 40, and may be located within the housing, if desired. In the implementation shown, the coupler 50 includes a peg 53 extending outwardly from the base 40, at a desired angle, and is shown as being parallel or generally parallel to the pivot axis 30, although that is just one of many possibilities. The peg 53, in the implementation shown, is carried by a link 54 that is coupled to the base 40 at a coupler pivot 56 so that the link 54 may rotate relative to the base 40 about an axis 58 of the coupler pivot. In the example shown, the coupler pivot axis 58 (FIG. 5) is parallel to the first pivot axis 30 although that angle may be different in different embodiments. Hence, in at least some implementations, the peg 53 is not constrained to move along an arc that is a fixed distance from the first pivot axis 30; the peg 53 may also move relative to the first pivot axis 30 about the coupler pivot axis 58.

The cable actuator 52 includes a coupler 60 that is adapted to mate with the shift member coupler 50 so that the cable actuator is actively driven by movement of the shift member 20. In the example shown, the cable actuator coupler 60 includes a socket 62 or void in which the peg 53 is received. Because the peg 53 moves as the shift member 20 moves, the cable actuator 52 is moved as the shift member moves. Arrangements other than the peg 53 and socket 62 may be used to couple the base 40 and cable actuator 52.

Figure 2:
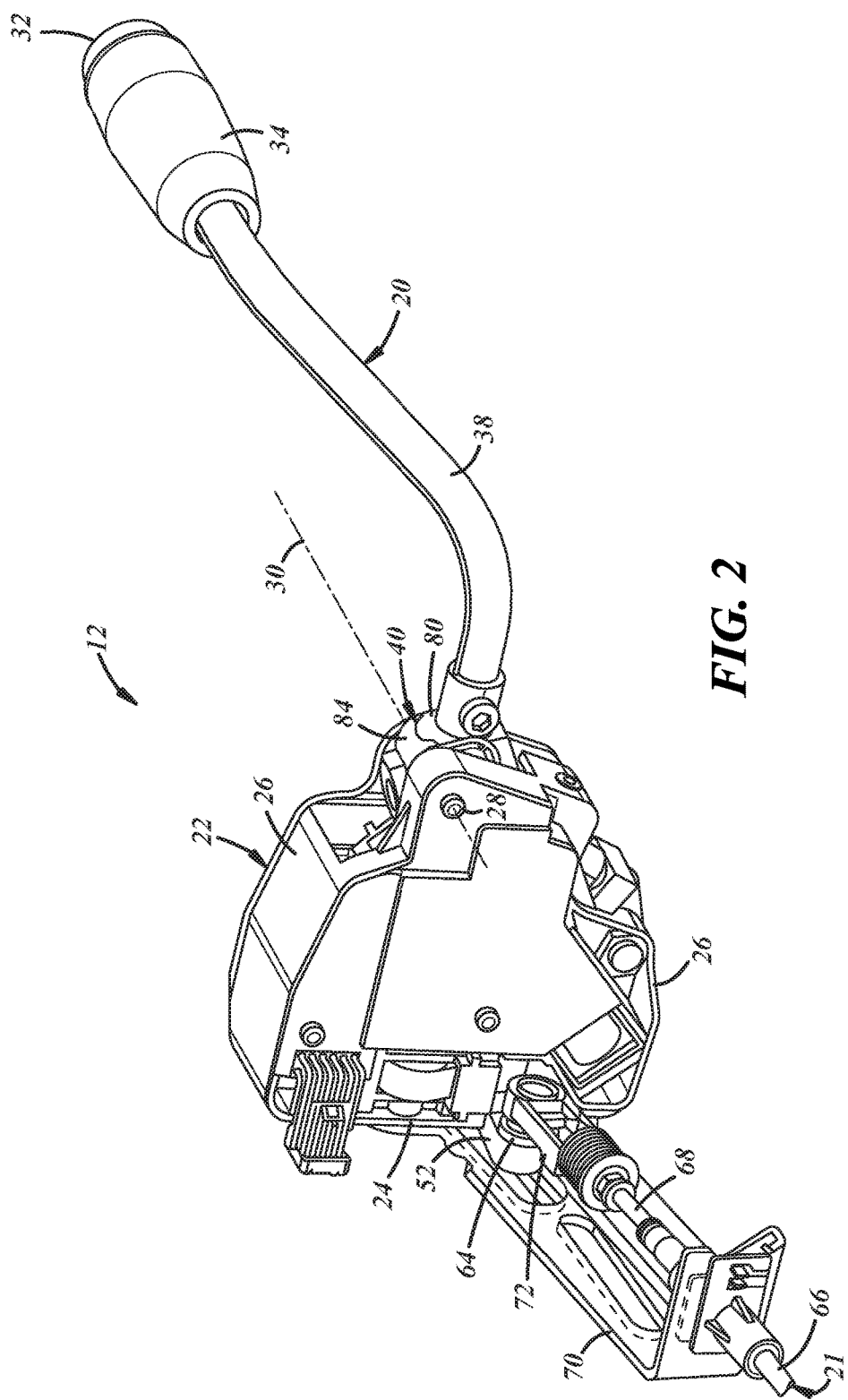
FIG. 2 is a perspective side view of the shifter including a shift lever and shift cable driven the by shifter.

The cable actuator 52 further includes a cable connector 64 that is adapted to connect to the transmission shift cable 21 so that the shift cable is driven as the cable actuator 52 moves. As shown in FIGS. 1, 2 and 5, the shift cable 21 may be a bowden-style cable having a tubular conduit 66 surrounding an inner core 68 that may be pushed and pulled for movement relative to the conduit. The conduit 66 may be held in place at each of its ends, and the core 68 may be coupled at one end to the cable actuator 52 and at its other end to a shifting mechanism of the transmission. In the example shown, the conduit 66 may be coupled to a bracket 70 extending from the housing 22, and the core 68 may be coupled to a connector 72 (FIG. 2) that is coupled to the cable connector 64 of the cable actuator 52. In use, movement of the shift member 20 moves the cable actuator 52 which moves the shift cable core 68 relative to the conduit 66 to move the transmission shifting mechanism and cause a transmission shift.

The cable actuator 52 is coupled to the housing 22 (or an adjacent structure) at a second pivot 74, spaced from the coupler 60 and the first pivot 28, and preferably also spaced from the cable connector 64. The cable actuator 52 may include a body 76 that extends between the coupler 60, second pivot 74 and cable connector 64. The body may be rigid so that all parts of the body move in unison and without movement relative to each other. In one example, the body 76 is formed from molded plastic so that all features of the body are defined in one continuous body. The continuous body 76 may include overmolded inserts that may be used for strength and to define or reinforce the coupler 60 or the cable connector 64 as desired. The body 76 need not be an entirely homogenous piece of plastic but may nevertheless be a single piece rather than multiple pieces connected together by fasteners, welding or some process done after formation of the body.

In at least some implementations, the second pivot 74 defines a second axis 78 that is offset from and not parallel to the first axis 30. Also, the cable connector 64 may be oriented to drive the shift cable 21 in a direction that is not parallel to the second axis 78. In this way, the direction in which the shift cable 21 is driven may be altered to enable a desired routing of the shift cable within the vehicle. The routing of the shift cable 21 may be constrained by other components, a desired overall size of the shifter assembly, or other factors.

In a conventional transmission shifter assembly, the shift cable is connected to and driven by the shift lever in a direction perpendicular to an axis about which the shift lever pivots (called the first axis in this disclosure). In a typical configuration, the first axis 30 extends in a cross-car direction, where the cross-car direction is between a driver side and a passenger side of the vehicle, perpendicular to a fore-aft direction which is between the front and rear of the vehicle. Therefore, in a conventional shifter assembly, the shift cable is driven in the fore-aft direction, perpendicular to the cross-car direction.

As will be described in more detail later, in the shifter assembly 12 disclosed herein, with the cable actuator 52 driven about the second pivot 74, the shift cable 21 may be driven in a direction at least 20 degrees offset or inclined (in either direction) relative to the fore-aft direction, and can be driven in the cross-car direction, 90 degrees offset from the fore-aft direction, if desired. When the shifter assembly 12 is mounted to a dashboard or instrument panel 10, this enables the shift cable 21 to extend from the shifter assembly 12 generally parallel to the instrument panel which may reduce the fore-aft dimension of the shifter assembly 12 which may reduce the amount that the shifter (i.e. adjacent portion of dashboard trim) extends into a passenger compartment of the vehicle or otherwise meet customer location and dimension criteria.

The specific implementation shown in FIGS. 2-5 drives the shift cable 21 parallel to the first pivot axis 30 and perpendicular to the second pivot axis 78. To do this, the first and second pivot axes 30, 78 are perpendicular to each other, and the cable connector 64 extends perpendicular to the second pivot axis 78 so that the point of connection between the cable connector 64 and the shift cable 21 sweeps a path that is perpendicular to the second pivot axis 78. The second pivot axis 78 could be inclined relative to the first pivot axis 30 at an angle other than 90 degrees to achieve a different drive direction for the shift cable 21.

As shown in FIG. 3, in the implementation shown, the path of movement of the cable connector is arcuate and within an imaginary plane 92 that is parallel to the first pivot axis 30 and perpendicular to an imaginary plane 94 perpendicular to the first pivot axis 30 (and in this example, plane 94 is parallel to the second pivot axis 78). However, the plane 92 may be oriented at other angles to the plane 94 and/or the first pivot axis 30 to facilitate routing the shift cable in a desired direction relative to the shifter assembly 12 and vehicle in which the shifter assembly is received. In at least some implementations, the plane 92 may be at an angle of, or offset by, at least 10 degrees relative to the plane 94, and plane 92 may be oriented in any direction relative to the plane 94 so long as it is not parallel to and is offset by at least 10 degrees relative to plane 94.

To accommodate the multi-pivot motion described above for the shift member 20 and the cable actuator 52 (e.g. motion of base 40 about first pivot axis 30 and motion of cable actuator 52 about second pivot axis 78), the interface between these components permits relative motion between the components. In more detail, the socket 62 is moved along an arc that is spaced a fixed radius from the second pivot axis 78, and the coupler pivot axis 58 (at or near the second end 38 of the shift member 20) is moved along an arc that is spaced a fixed radius from the first pivot axis 30. While the arcuate paths of the coupler pivot 56 and socket 62 may intersect at one or two points, the paths are not in the same plane and diverge during some portion of the movement of the shift member 20 and cable actuator 52 move during a transmission shift. The link 54 accommodates the divergence between the paths of the base 40 (e.g. at coupler pivot 56) and the socket 62 in the direction of movement of the cable connector 64. In other words, the link 54 permits the peg 53 to move toward or away from the first pivot axis 30, in a plane perpendicular to the first pivot axis 30 (in the implementation shown), and in a plane parallel to the second pivot axis 78.

Further, with the first and second pivot axes 30, 78 not parallel to each other, the arcuate paths are not in the same plane and are not in planes that are parallel to each other. Accordingly, some relative movement in a direction parallel to the first pivot axis 30 also occurs as the base 40 and cable actuator 52 move, and this may be accommodated by the peg and socket, or in other ways, as desired.

In the orientation shown in FIG. 5, as the shift member 20 is pivoted counter-clockwise about the first pivot axis 30, the cable actuator 52 is pivoted clockwise about the second pivot axis 78. This moves the cable connector so that it pulls the associated end of the core 68 of the shift cable 21 toward the housing 22 and away from the conduit 66. When the shift member 20 is pivoted in the opposite direction, clockwise about the first pivot axis 30, the cable actuator 52 is pivoted counterclockwise about the second pivot axis 78. This moves the cable connector 64 so that it pushes the associated end of the core 66 of the shift cable 21 toward the conduit 66.

In at least some implementations, as the shift member 20 is moved to cause a transmission shift, at least two degrees of freedom or modes of relative movement are provided between the shift member 20 and the cable actuator 52. In the example shown, there are at least 2 degrees of freedom or modes of relative movement, namely: 1) the link 54 permits the peg 53 to move relative to the first pivot axis 30 in a plane parallel to the second pivot axis 78; and 2) the peg 53 may rotate or otherwise move within the socket 62. Such movements accommodate movement of the base 40 about the first pivot axis 30 and the cable actuator 52 about the second pivot axis 78, where the first and second pivot axes are not parallel. Other arrangements to accommodate the various directions of movement may be utilized, as desired.

Cross-car movement of a portion of the shift member may be permitted, if desired in certain implementations (e.g. to permit some cross-car movement through a gate requiring such movement). In the example shown, the base 40 includes a first portion 80 coupled to the shift member and the pivot via a boss 82 and a second portion 84 that is pivoted relative to the first portion about a secondary pivot 86 having a pivot axis 88. A biasing member, such as a spring 90, may be provided to yieldably bias the second portion 84 against the first portion 80.

Figure 6:
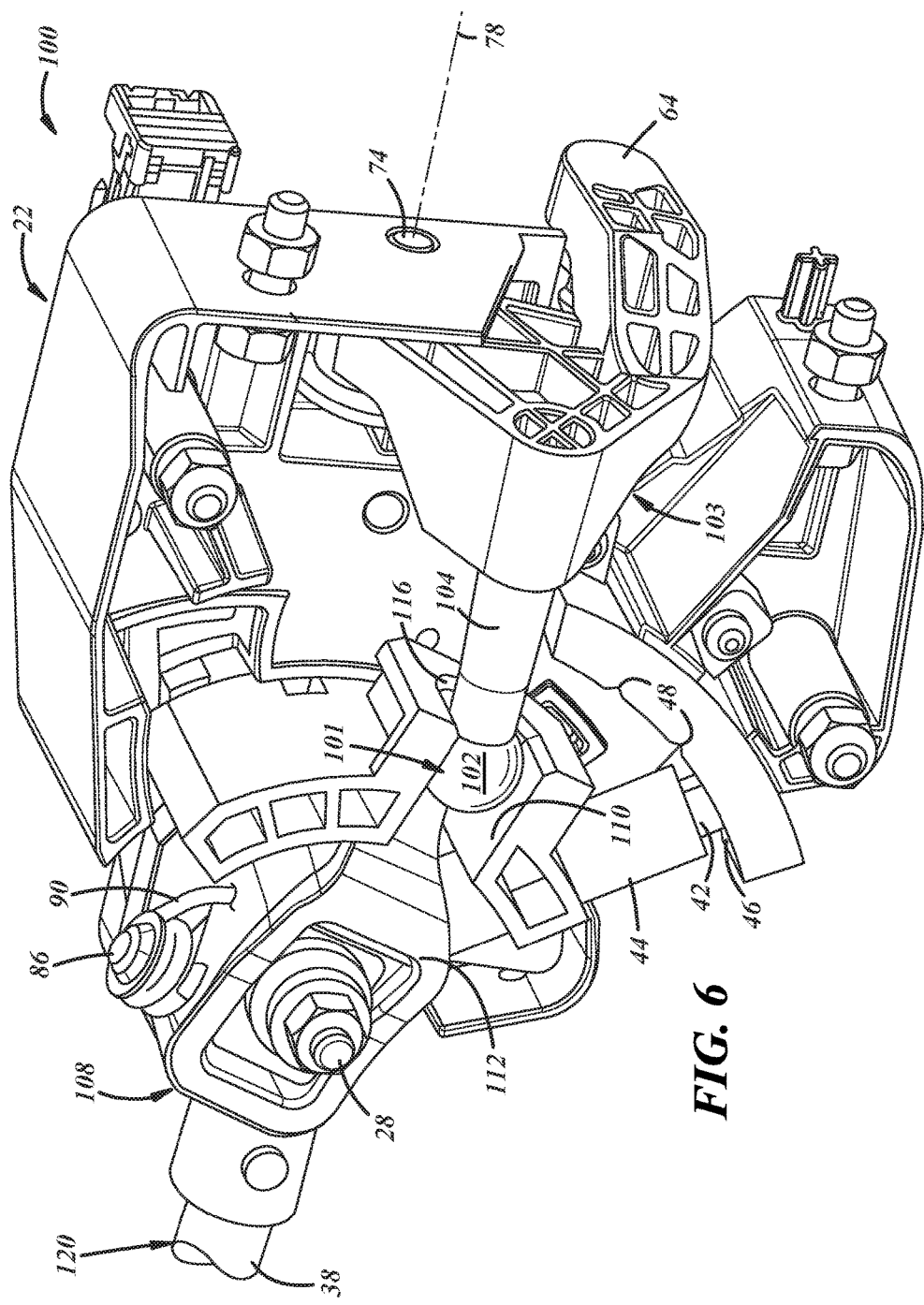
FIG. 6 is an enlarged, fragmentary, perspective view of a shifter including a modified cable actuator interface.

One alternate arrangement of a shifter assembly 100 is shown in FIG. 6. The shifter assembly 100 may be arranged and may function in much the same manner as the shifter assembly 12. The description of FIG. 6 will be directed to the coupling of the shift member to the cable actuator. For ease of understanding and description, some components that are the same in the shifter assembly 100 as in the shifter assembly 12 are labeled in FIG. 6 with the reference numeral used with regard to the shifter assembly 12.

In this example, a coupler 101 of a cable actuator 103 may include a ball 102 carried by an extension 104 of the cable actuator 103. To receive and couple with the ball 102, the shift member base 108 may include a socket or pocket 110. As the shift member 120 is moved to cause a transmission shift, the base 108 engages the ball 102 and drives the cable actuator 103 for movement about the second pivot axis 78. The ball 102 may move within the pocket 110 and relative to the base 108 as the path of the ball diverges from the path of the pocket. The base 108 may include a second portion 112 that may pivot about a cross-car or secondary pivot 86, if desired, and a biasing member 90 may also be provided if desired. The remainder of the components and the operation of this embodiment shifter assembly 100 may be the same as set forth above with regard to FIGS. 1-5.

In some implementations, the divergence of the paths of the coupler 56 and the socket 62 in this direction may be accommodated at least partially by permitting a corresponding movement of a portion of the base 40 to which the coupler pivot 56 is connected. For example, the base 40 may be formed in more than one piece with a first portion coupled to the rod 30 and the first pivot 28, and a second portion coupled to the first portion at a secondary pivot. The secondary pivot may have an axis at an angle greater than zero relative to the first pivot axis to permit the second portion of the base 40 to pivot relative to the first pivot axis 30 and provide an additional component of motion for the coupler or socket. A biasing member, such as a spring, may act on and yieldably bias the second portion of the base 40 in a direction tending to keep the peg 53 received within the socket 62. While described with reference to the embodiment shown in FIGS. 1-5, the same concept may be used with the embodiment of FIG. 6 wherein a portion of the base that includes the pocket may pivot relative to another portion of the base coupled to the first pivot.

While the forms of the invention herein disclosed constitute presently preferred embodiments, many others are possible. For example, while shown and described with regard to embodiments wherein the second pivot axis is perpendicular to the first pivot axis, other angles may be provided between the pivot axes to enable different routing of the shift cable relative to the housing and vehicle. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A shifter for a vehicle transmission, the vehicle also having a steering assembly including a main shaft, comprising:
   a shift member mounted separately from the main shaft and pivoted at a first pivot for movement between multiple positions corresponding to multiple transmission gears; and
   a cable actuator pivoted at a second pivot, driven for movement about the second pivot by movement of the shift member about the first pivot and having a cable connector adapted to be connected to a shift cable associated with the vehicle transmission, wherein the first pivot is arranged about a first axis that is not parallel to the main shaft and the second pivot is arranged about a second axis that is not parallel to the first axis, and wherein a path of movement of the cable actuator is within an imaginary plane that is not parallel to the main shaft and is at an angle of at least 10 degrees to an imaginary plane that is perpendicular to the first axis.

2. The shifter of claim 1 wherein the cable actuator includes a cable connector adapted to be connected to the shift cable, and wherein the path of travel of the cable connector is at an angle of at least 10 degrees relative to a plane perpendicular to the first axis.

3. The shifter of claim 1 wherein the cable actuator includes a coupler that is engaged by the shift member to move the cable actuator as the shift member moves during a transmission shift.

4. The shifter of claim 3 wherein the engagement between the coupler and the shift member accommodates movement of the coupler relative to the shift member as the shift member moves.

5. The shifter of claim 4 wherein the shift member includes a coupling element that is movable relative to the cable actuator to permit the cable actuator to pivot about the second axis while the shift member pivots about the first axis.

6. The shifter of claim 4 wherein one of the shift member and the cable actuator includes a peg and the other of the shift member and the cable actuator includes a socket in which the peg is received.

7. The shifter of claim 4 wherein one of the shift member and the cable actuator includes a ball and the other of the shift member and the cable actuator includes a pocket in which the ball is received so that the ball may slide within the pocket.

8. The shifter of claim 1 wherein the second axis is perpendicular to the first axis.

9. The shifter of claim 2 which also comprises a shift cable having a core slidably received within a conduit and wherein the core is connected to the cable connector and movement of the cable actuator about the second pivot moves the core relative to the conduit.

10. A shifter for a vehicle transmission, comprising:
a shift member pivoted at a first pivot for movement between multiple positions corresponding to multiple transmission gears;
a cable actuator pivoted at a second pivot, driven for movement about the second pivot by movement of the shift member about the first pivot and having a cable connector, wherein the first pivot is arranged about a first axis and the second pivot is arranged about a second axis that is not parallel to the first axis;
a link coupled to the shift member at a coupler pivot so that the link moves with the shift member as the shift member moves and the link pivots relative to the shift member about the coupler pivot, the link including a portion that is engageable with the cable actuator to displace the cable actuator about the second pivot as the link moves; and
a shift cable having a core received within a conduit and movable relative to the conduit, wherein the core is connected to the cable connector and movement of the cable actuator about the second pivot moves the core relative to the conduit and wherein the shift cable is adapted to be connected to a transmission shift mechanism so that movement of the core causes a transmission shift when the shifter is installed on the vehicle.

11. The shifter of claim 10 wherein the cable actuator includes a coupler that is coupled to the link to move the cable actuator as the shift member moves during a transmission shift.

12. The shifter of claim 11 wherein the coupling between the coupler and the link accommodates movement of the coupler relative to the link as the shift member moves.

13. The shifter of claim 10 wherein a path of movement of the cable actuator is arcuate and within an imaginary plane that is at an angle to an imaginary plane that is perpendicular to the first axis.

14. A shifter for a vehicle transmission, comprising:
a shift member pivoted at a first pivot for movement between multiple positions corresponding to multiple transmission gears;
a cable actuator pivoted at a second pivot, driven for movement about the second pivot by movement of the shift member about the first pivot and having a cable connector adapted to be connected to a shift cable associated with the vehicle transmission, wherein the first pivot is arranged about a first axis and the second pivot is arranged about a second axis that is not parallel to the first axis; and
a link coupled to the shift member at a coupler pivot so that the link moves with the shift member as the shift member moves and the link pivots relative to the shift member about the coupler pivot, the link including a coupler that is engageable with the cable actuator to displace the cable actuator about the second pivot as the link moves.

15. The shifter of claim 14 wherein the coupler pivot defines a coupler pivot axis about which the coupler of the link moves relative to the shift member toward and away from the first axis.

16. The shifter of claim 14 which also comprises a cable actuator coupler carried by the cable actuator and which is engaged by the coupler of the link so that the cable actuator is moved as the shift member moves during a transmission shift, and wherein one of the coupler of the link and the cable actuator coupler includes a peg and the other includes a socket in which the peg is at least partially received.

17. The shifter of claim 16 wherein the peg may move relative to the socket.

18. The shifter of claim 14 wherein the shift member includes a base having a first portion coupled to the shift member and the first pivot, and a second portion that is pivotable relative to the first portion about a secondary pivot that is not parallel to the first pivot, and the shift member may pivot about both the first pivot and the secondary pivot.

19. The shifter of claim 18 wherein the first pivot is arranged to permit movement of the shift member in one of a fore-aft direction or a cross-car direction and the secondary pivot is arranged to permit movement of the shift member in the other of the fore-aft direction or a cross-car direction.

* * * * *